(12) United States Patent
Tschudi et al.

(10) Patent No.: US 8,908,191 B2
(45) Date of Patent: Dec. 9, 2014

(54) METHOD FOR ZERO-CONTACT MEASUREMENT OF TOPOGRAPHY

(75) Inventors: Theo Tschudi, Darmstadt (DE); Bernhard Braunecker, Rebstein (CH)

(73) Assignee: Jos. Schneider Optische Werke GmbH, Bad Kreuznach (DE)

(*) Notice: Subject to any disclaimer, the term of this patent is extended or adjusted under 35 U.S.C. 154(b) by 454 days.

(21) Appl. No.: 13/202,560

(22) PCT Filed: Feb. 19, 2010

(86) PCT No.: PCT/EP2010/001060
§ 371 (c)(1),
(2), (4) Date: Oct. 13, 2011

(87) PCT Pub. No.: WO2010/094498
PCT Pub. Date: Aug. 26, 2010

(65) Prior Publication Data
US 2012/0033228 A1 Feb. 9, 2012

(30) Foreign Application Priority Data

Feb. 21, 2009 (DE) .......................... 10 2009 010 019

(51) Int. Cl.
*G01B 11/02* (2006.01)
*G01B 11/24* (2006.01)
*G01M 11/02* (2006.01)
*B24B 49/12* (2006.01)
*B24B 17/04* (2006.01)

(52) U.S. Cl.
CPC .......... *G01B 11/2441* (2013.01); *G01M 11/025* (2013.01); *B24B 49/12* (2013.01); *B24B 17/04* (2013.01)
USPC ........................................................ 356/515

(58) Field of Classification Search
USPC .................................. 356/515, 513; 73/7, 104
See application file for complete search history.

(56) References Cited

U.S. PATENT DOCUMENTS 6,301,009 B1 * 10/2001 Tinker ........................... 356/511
6,413,147 B1 * 7/2002 Litvak ............................... 451/7
(Continued)

FOREIGN PATENT DOCUMENTS

DE 3048558 A1 7/1982
DE 69314829 T2 9/1993
(Continued)

OTHER PUBLICATIONS

English_Abstract_DE_29807423_U1, Nov. 19, 1998.

*Primary Examiner* — Hwa (Andrew) Lee
*Assistant Examiner* — Jonathon Cook
(74) *Attorney, Agent, or Firm* — IPXLAW Group LLP; Claude A. S. Hamrick

(57) ABSTRACT

A method for zero-contact measurement of the topography of a spherically or aspherically curved air-glass surface of an optical lens or lens combination, distinguished in that the surface (S1) to be measured is sampled on its glass rear side with an optical measurement beam through the air-glass surface (S2) lying before it in the measurement direction. A device for carrying out the method is characterized in that
a) the optical lens (2) or the lens system is fastened on the end side of a rotatably mounted hollow shaft (1) such that the optical axis of the lens or lens system is at least approximately aligned with the rotation axis (3) of the hollow shaft (1),
b) focusing optics (6) for an optical measurement beam (10) are arranged inside the hollow shaft,
c) the measurement unit (7) for generating the measurement beam (10) is arranged so as to be displaceable perpendicularly to the rotation axis (3) of the hollow shaft (1),
d) at least one beam splitter (11) for separating a partial beam and forwarding it onto at least one optical sensor (12) is inserted into the measurement beam (10), and
e) an optoelectronic transducer and evaluation electronics are assigned to the sensor (12).

15 Claims, 5 Drawing Sheets

(56) References Cited

U.S. PATENT DOCUMENTS

| | | | |
|---|---|---|---|
| 6,437,868 B1* | 8/2002 | Coult et al. | 356/630 |
| 6,714,308 B2* | 3/2004 | Evans et al. | 356/513 |
| 7,009,714 B2* | 3/2006 | Ohmoto et al. | 356/504 |
| 7,713,106 B2* | 5/2010 | Sekiya | 451/8 |
| 2003/0169430 A1 | 9/2003 | Ohtsuka et al. | |
| 2005/0083537 A1* | 4/2005 | Kuchel | 356/513 |
| 2007/0236701 A1 | 10/2007 | Neal et al. | |
| 2007/0247639 A1 | 10/2007 | Van Amstel et al. | |
| 2008/0079950 A1 | 4/2008 | Harned et al. | |

FOREIGN PATENT DOCUMENTS

| | | |
|---|---|---|
| DE | 29807423 U1 | 11/1998 |
| DE | 198 54 942 C2 | 6/2000 |
| EP | 0 395 831 A1 | 7/1990 |
| EP | 0 561 178 A2 | 9/1993 |
| EP | 0 561 178 A2 | 9/1993 |

* cited by examiner

METHOD FOR ZERO-CONTACT MEASUREMENT OF TOPOGRAPHY

The invention relates to a method for zero-contact measurement of the topography of a spherically or aspherically curved air-glass surface of an optical lens or lens combination and to a device suitable therefor.

Besides spherical lenses, precision optical systems increasingly use elements having aspherical surfaces. While spherical surfaces are characterized by a constant value of the radius of curvature over the entire optically active surface, in the case of aspheres the local curvature vector deviates both in direction and in magnitude from the comparable vector of a sphere. The way in which this deviation varies depends on the application of the asphere: for use in axisymmetric imaging objectives, a radial dependency of the surface function relative to the optical axis is usually sufficient, while for example scanning systems often require "freeform surfaces" on which the curvature vectors differ from one another in magnitude and direction at each surface point.

To date, aspheres for high-quality systems have been approximately 10× more expensive than spheres of comparable size and surface accuracy, so that their use has been viable only in exceptional cases. The cost difference can be explained by the fact that in contrast to aspheres, spherical surfaces can be polished by tools with a large surface area while uncontrolled tangential movements of the tool guide are substantially irrelevant, and often even desirable, for the polishing process. For this reason, good accuracies of the surface shape and fit can still be achieved even with relatively simple machine kinematics. Furthermore, the tool wear is low owing to the large-area application.

The situation is entirely different with aspheres, for which the aforementioned position dependency of the curvature vector necessitates not only polishing movements guided over small surface areas but also very precise measurement methods, in order to ensure the requisite accuracy of the machine guidance. Furthermore, the tools are worn to a much greater extent by the local correction movements than in sphere production. All these cost-increasing factors have so far prevented widespread use of aspheres in optical systems of lower to medium production runs, since the achievable optical advantages do not justify the high outlay costs.

This first changed when, in mass consumer products such as cellphone cameras, the advantages of aspheres which can be manufactured very economically by impression or replication methods became too obvious. This then also stimulated the production methods developed in Europe for high-performance optics. It is now substantially agreed in technical circles that the use of aspheres can be economically justified if the aforementioned cost factor can be reduced from currently 10 to approximately 3. In order to achieve this, the current manufacturing methods need to have their cost-increasing weaknesses investigated and it is necessary to find ways of improvement.

Surveys among leading asphere manufacturers have revealed that besides reproducible precise machine kinematics and the computer-controlled monitoring thereof, above all the process of measuring the current surface shape and surface fit is of crucial importance. There is no doubt that the measurement process must simultaneously access the surface portion being processed by the polishing tool, in order to detect the current surface deformation and the polishing state, and thereby to control the actual polishing process. This, however, means full integration of the measurement operation into the processing operation (in-line metrology). If it took place at a later time or not precisely at the instantaneous processing location, important local processing parameters such as e.g. temperature variations as well as local mechanical deformations or stresses in the glass body would not be detected. It is precisely knowledge about these, usually a priori undetectable, parameters which decides whether the desired polishing state can be achieved with tolerances in the nm range.

These requirements, however, meet with two problems: on the one hand, the measurement apparatus cannot access the momentarily processed surface position, since it is covered by the polishing tool. On the other hand, precise shape acquisition is generally critical since the position is contaminated by the polishing agent, a turbid suspension of mineral particles. In practice, an intermediate step of surface cleansing must therefore be introduced. This takes unnecessary time, allows the sample to cool uncontrolledly and is generally only limitedly successful since adequate cleansing for precisions in the nm range would require removal of the lens from the processing center. Then, however, the reference coordinate system for the polishing process would be lost, and according to experience it is very expensive to restore it after cleansing has been carried out. Furthermore, chemical-mechanical cleansing by etching processes can uncontrolledly modify the surface. The same applies for cleansing with ultrasound, which in principle is always aggressive.

There is a great demand for zero-contact determination of the topography of a spherically or aspherically curved optical element, in particular in the production of high-precision lenses. For already existing and future optical systems, ever greater requirements are being placed on precision. It is becoming necessary to determine the topography of the surfaces with subnanometer accuracy.

To this end, for example, the following measurement methods are used:

a) Surface interferometric testing methods: these are ideal for the quality assessment of optical components. The testing of aspherical optical surfaces or systems, however, almost always requires special zero compensators. For this task, computer-generated holograms (CGHs) are often used. They are distinguished in that an incident wavefront can be manipulated almost arbitrarily with a single diffractively acting functional surface. For the production and testing of, in particular, small series of lenses, these methods are however not particularly suitable since the production of CGHs is currently still expensive and the CGHs have to be recalculated for each type of lens. Furthermore, placing the measurement accuracy in the subnanometer range is extremely demanding.

b) EP 0 395 831 A1 describes the measurement of curved surfaces, in particular the cornea of a human eye. The measurement principle is based on the generation of a predetermined pattern with the aid of a plurality of light sources, the light rays from which are reflected from the surface to be studied. Irregular curvatures of the surface lead to distortions of the predetermined pattern. The pattern generated by the plurality of light sources limits the evaluation accuracy of this method.

c) EP 0 561 178 A2 describes a method in which the determination of the local curvature of the surface at the measurement point is carried out by detecting the position of the beam reflected by the measurement point (triangulation). In this case, only the $1^{st}$ moment, i.e. the inclination of the acquired surface, is measured. This method also does not, for example, allow measurement of a surface with an accuracy in the nanometer or even subnanometer range.

d) The invention in DE 198 54 942 C2 relates to a method for zero-contact optical measurement of the topography of macroscopically smooth surfaces of spherically or aspherically curved specimens, in which the surface to be measured is sampled with a very small aperture in comparison with the extent of the surface and, for each measurement point, a local curvature of the surface is determined at the measurement point by the measurement beam. In this case, the measurement beam must be aligned substantially perpendicularly to the surface, so that an interferogram is formed at the measurement point from a coherent incident beam and the measurement beam reflected by the surface, respectively, and so that the determination of the curvature from the interferogram is achieved by comparison of the measured, evaluated or unevaluated, interferogram with data of an analytical three-dimensionally curved surface which is varied in its parameters for matching. The determination of the surface topography is then carried out by a computer evaluation of the curvature values determined over the entire surface, for example by twofold integration. This integration is preferably carried out according to a conventional evaluation method using Fourier transforms in frequency space. Such an evaluation is elaborate, and can readily include measurement errors due to the summation.

These measurement methods do not, for example, enable the measurement of a surface with an accuracy in the nanometer or even subnanometer range when the workpiece is clamped in a processing machine. The surface requires very careful cleansing so that any remaining grinding or polishing agents do not simulate surface defects.

In order to achieve greater reproducibility and accuracy of the topography measurement, it is necessary to carry out the measurement process on the surface with a specimen firmly clamped to the production machine (grinding or polishing machine). In this case, measurement from the processing side is possible only if the surface to be measured is free of grinding and polishing agents. Furthermore, the mechanical structure of the processing machine may prevent a measurement apparatus from being able to sample the entire surface region to be measured. In particular, current grinding and polishing machines are provided with complex tool heads. These conditions make rapid and accurate topography measurement more difficult.

Object:

It is therefore an object of the present invention to provide a measurement method for determining the topography of arbitrarily curved surfaces, which permits high accuracy and reproducibility of the measurement and, in particular, can be used when the lenses or lens combination are in the clamped state on the grinding and polishing machine.

In a method of the type mentioned in the introduction, this object is achieved according to the invention by the characterizing features of claim 1. Advantageous refinements are given by the features of dependent claims 2 to 9. A device suitable for carrying out the method is given by the characterizing features of claim 10. Advantageous refinements of this are given by the features of the dependent claims 11 to 15.

The conceptual solution approach of the invention consists of resolving the access conflict of the processing tool and the measuring device in that, since the surface segment is polished from the air-glass side, it is simultaneously measured from the other side, i.e. the glass-air side. The problem of contamination is therefore also solved, since the shape acquisition of the glass surface does not have to take place two times through the polishing agent.

In the measurement according to the invention, the measurement beam is transmitted from the rear side through an e.g. already processed, polished surface.

In order to overcome the disadvantages in the known embodiments mentioned above, an absolutely measuring interferometer is furthermore used in the present invention for distance determination; it measures the distance from the measurement points approached on the surface to the fixed front surface of the optical measurement head. A coordinate value placed absolutely in space is therefore obtained for each point on the surface to be tested, and integration processes do not therefore need to be carried out.

The measurement accuracy is in this case determined by the resolution of the interferometer, which can be as fine as the subnanometer range.

The way in which the surface function can be acquired physically and technically "on-line", in a process-compatible way, is a further part of the invention. Three variants (mere reference examples) which physically acquire the surface profile of the asphere will be described below:

a) Lidar (first reference example):

The first method considered is to scan the test surface with a coherent laser ranger or equivalently an interferometric phase measurement method and carry out a highly precise distance measurement between the test surface and a suitable comparison surface in the transmission/reception module, or in the interferometer. In this case, the height profile of the test surface is recorded as an average over the diameter of the illuminating beam.

b) Wavefront sensor (second reference example):

An alternative but likewise practicable method is to image the surface segment acquired by the illuminating laser beam onto a wavefront sensor (WFS). This then determines the average geometrical inclination of the surface of the subsegment from the inclination of the reflected wavefront, likewise relative to a reference surface.

c) Sensor fusion (third reference example):

In practice, a combination of the two methods has also proven expedient, in which the surface segment acquired by the laser beam is on the one hand imaged onto a WFS, but on the other hand the average distance is also simultaneously measured. Experience has shown that this leads to a substantial accuracy increase and to a more rapid convergence of the evaluation algorithms, but also that the robustness of the algorithmic method is increased with respect to false secondary maxima not being included in the optimization. Specifically, the actual measurement process always has stochastic perturbations superimposed on it, due to wobble movements of the axis spindle, "stick and slip" movements of the polishing tool, but also jitter movements of the scanners which guide the laser beam over the test surface.

Although the description of an asphere by the continuous profile of its curvature vector is mathematically correct, it must however still be discretized suitably for the manufacturing process. In this case it is important to know on which 2D surface grid the curvature needs to be known in order to uniquely characterize the momentary processing state and transition it to the subsequent one. The required grid may readily change in the course of processing. A surface shape which is fissured or has drifted from that intended must be sampled more densely than a polished surface shortly before reaching final specification.

In all three methods mentioned above, for efficiency reasons it is always desirable to make do with a minimum amount of measurement data, i.e. to avoid "oversampling". The appropriate "sampling" depends both on the surface topography of the specimen and on the uniqueness range of the sensor. The more coarsely sampling is carried out, the more fine structures of the surface deformation may be lost, and the more likely it is that the measurement range of the sensor will be overdriven. Precisely in the latter case, when the intention remains to acquire the entire test surface in one operation, the deviations of the test surface from the reference surface are often greater than one wavelength. It is then necessary to employ mathematical methods which resolve the ambiguity of the interferometric signals, which is demanding, or one must rely on so-called "zero optics", computer holograms or compensators. Since these are expensive, have to be manufactured specially for each application, and their mechanical installation in the optical test structure may also introduce new errors, sequential scanning of the entire surface is more practicable. In all three cases, it is therefore proposed to subdivide the test surface into subsegments and measure these according to methods a), b), c). To this end, in all three cases the illuminating laser beam must be guided over the test surface. Since the measurement is intended to be carried out synchronously with the polishing process, which requires azimuthal rotation of the test body about the spindle axis, the laser scan can only be carried out in the radial direction, i.e. one-dimensionally.

The 2D sampling grid in the radial and azimuthal directions is then set by means of the shot frequency of the laser, while taking into account the rotational movement and the speed of the radial scan. The size of the surface segments is established by the shot duration and the diameter of the laser beam. In this case, with strongly structured surfaces, sampling will be carried out so as to achieve an overlap of the surface segments, while a more point-like scan will be carried out when there are smooth surfaces.

Besides the average values of the distance over the surface segment according to a) or the inclination in method b), or both in c), depending on the sensor it is also possible to measure so-called higher deformation moments. A WFS can readily provide information about deviation of the reflected WF from the illuminating spherical or plane wave, making it possible to identify spherical, comatic or astigmatic aberrations of higher order. Likewise, the shape of the surface segment illuminated by the beam diameter can be inferred from the shape of the temporal return signal of the laser ranger.

In "on-line" monitored polishing of the aspherical shape S1 of a glass lens, it is assumed that its other side S2 has already been polished substantially within tolerance. Its surface topography is therefore known, having been determined for example by means of a workshop interferometer outside the polishing machine, and this should therefore be used as a reference surface for the actual process of polishing the asphere S1. This procedure places no restriction on generality, since even if the glass lens is intended to be asphericized on both sides, it is possible to begin with a sphere S1, asphericize the opposite side S2 as described and subsequently then use this as a reference for S1. After the specimen has been mounted on the polishing spindle, both the already known reference surface S2 is constantly measured directly by the test optics and also the S1 that is to be processed is measured using S2.

Acquisition on two sides has the advantage that S1 is always referenced with the only relevant coordinate system of the lens body, i.e. with itself. This makes it independent of axial wobble errors of the spindle, scanner movement perturbations to be described below, and above all unavoidable centering errors of the measurement optics, or zoom optics in which a plurality of modules have to be displaced along the optical axis.

The actual procedure is configured so that it is substantially similar to the method with which spherical lenses, cement components or even entire objectives are checked for centering errors in the optical workshop. In this case, the measurement laser is first focused at the center of curvature of the surface S2 lying closest to the zoom optics. The beam reflected from S2 is then likewise focused back to there and imaged by the zoom optics onto the sensor. If S2 is tilted, the center of curvature of S2 will not lie on the rotation axis of the spindle, and the sensor point will migrate circularly on the detector synchronously with the rotation axis, in which case the eccentricity of S2 can be determined from the circle diameter. The laser is then focused at the center of curvature of S1, but seen through S2, and the procedure is repeated. Information is obtained about the tilt of S1, but seen through S2, and this can be determined uniquely with respect to the rotation axis by taking into account the first measurement. In the asphere process to be described here, the procedure is similar: after the topography of S2 has been premeasured interferometrically, its position relative to the spindle axis is determined according to the described method. We then focus the laser at the center of curvature (best fit) of S1, seen through S2, and determine the surface tilt angle. Since, as mentioned previously, this is not constant in the case of aspheres, but locally varying, we reduce the aforementioned process to subsegments. For reasons of accuracy, we also do not evaluate the migration of the focal point but image the subsegment by the zoom optics onto a WFS (reference example). The effect achieved by restricting the test surface to a subsegment is that the local tilt lies in the measurement range of the WFS (reference example), and zero optics are thus not required.

In summary, the invention relates to a method for zero-contact optical measurement of the topography of the spherically or aspherically curved surface of an optical element by sampling the surface with a system-defined reference wavefront or with an aperture smaller than the extent of the surface, and determining the local wavefront deformation relative to the measurement system. The sampling wavefront is guided so that it is aligned substantially perpendicularly onto the test surface. The deviations caused by the aspherical shape are recorded by an interferometer or WFS (reference example), located in a sensor head, and evaluated. In this case the measurement beam is not sent from the outside directly onto the ground or polished air-glass surface, as is generally known, but through the imaging lens via its rear side. Consequently the surface can also be measured in the clamped state in the grinding or polishing machine. In this case, for example, it is necessary to establish whether the surface is free of perturbing irregularities and whether the desired deviation of an aspherical surface from the aspherical shape on which it is respectively based is maintained with sufficiently narrow tolerance.

A device for carrying out the method according to the invention is schematically represented in the drawing, in which.

Figure 1:
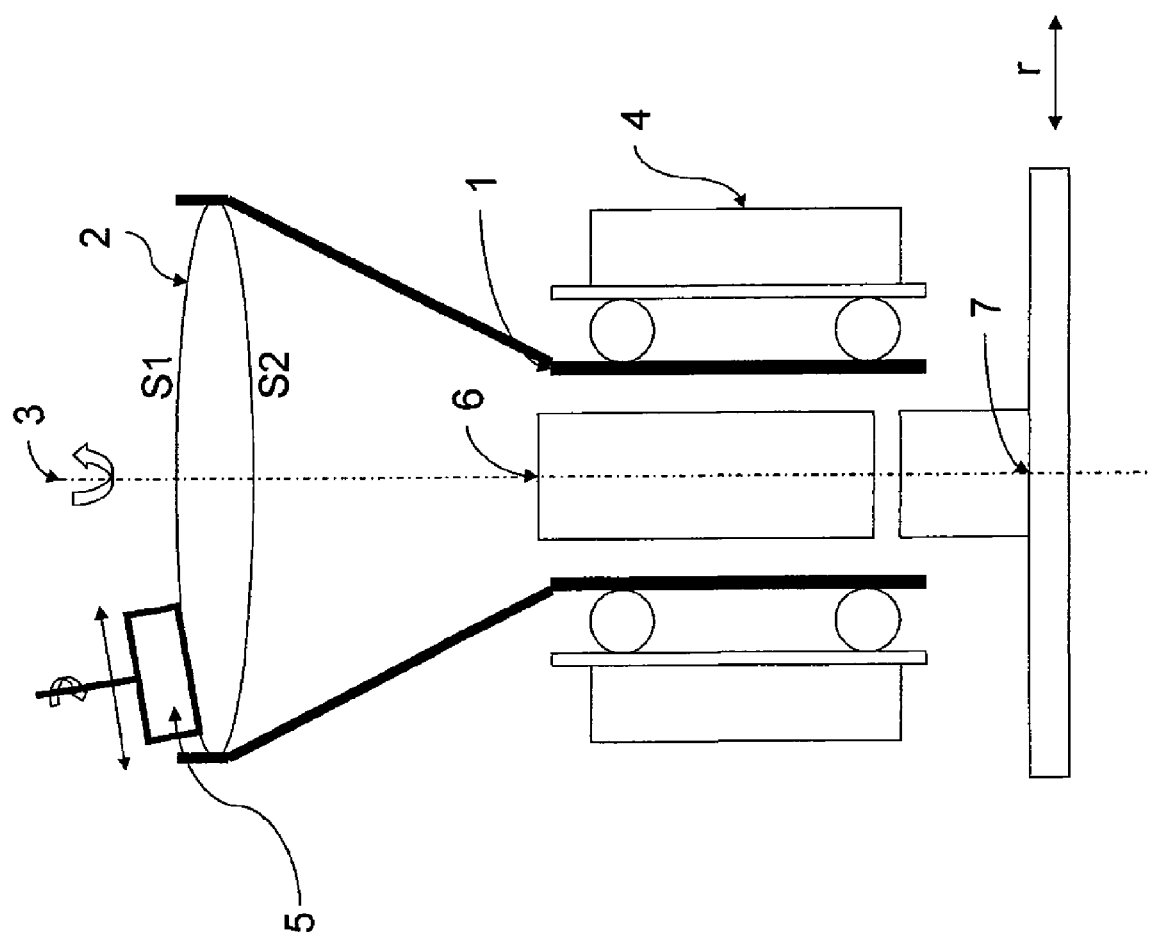
FIG. 1 shows the mechanical structure.

The mechanical arrangement represented in FIG. 1 contains a hollow shaft 1, which is widened upward in the shape of a funnel toward the end holder of a lens 2 or of a lens system. The rotation axis 3 of the hollow shaft 1 should coincide at least approximately with the optical axis of the lens 2 and of the zoom optics 6.

The hollow shaft 1 is mounted in a holding chuck 4 (not represented in further detail) of a grinding or polishing machine. The surface S1 of the lens is processed in the conventional way with a grinding or polishing head 5 guided in a wobbling movement over the surface S1.

The hollow shaft 1 contains focusing optics 6 for a measurement beam which is emitted by a measurement unit 7. Besides a system for generating the measurement beam, the measurement unit 7 also contains an optical sensor for measurement signal generation. The measurement unit 7 is arranged displaceably in the radial direction r, i.e. perpendicularly to the rotation axis 3.

Figure 2:
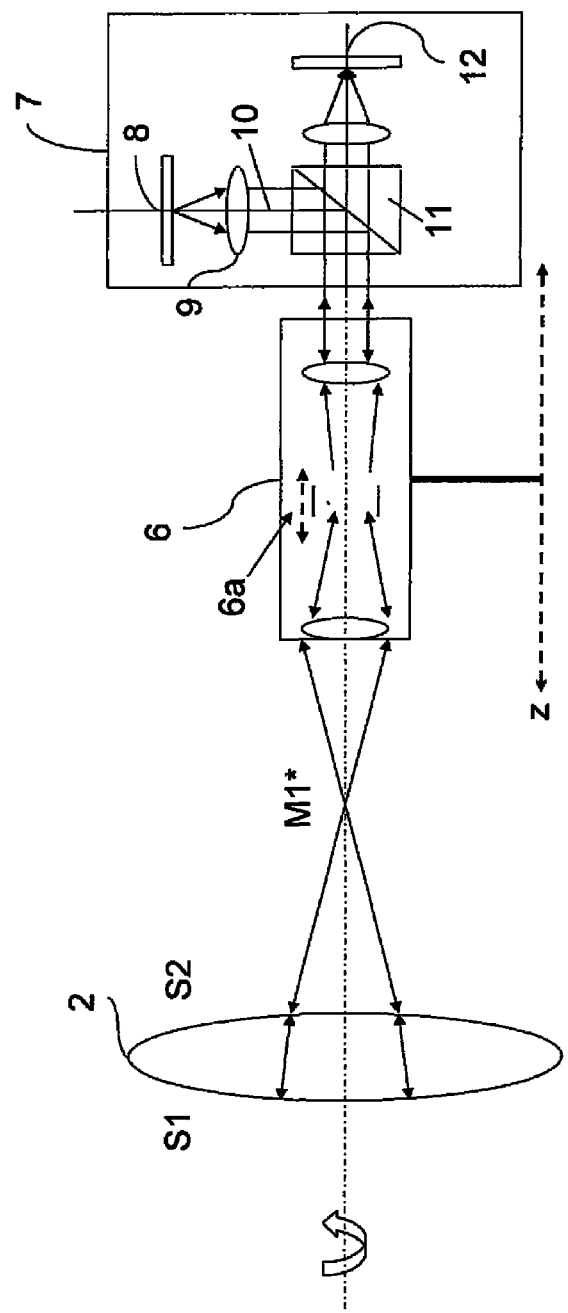
FIG. 2 shows the basic optical layout, as used in spherical chuck centering.

FIG. 2 shows the basic optical layout, as is known from spherical chuck centering. The lens 2 is arranged and aligned so that the centers of curvature of the surfaces S1 and S2 lie as far as possible on the rotation axis 3, i.e. the optical axis of the lens 2 is aligned with the rotation axis 3.

The measurement unit 7 contains a laser 8, e.g. a pulse laser, the coherent radiation of which is shaped by a collimation lens 9 into a parallel measurement beam 10. The measurement beam 10 is deflected by a beam splitter 11 into the focusing optics 6. The focusing optics 6 are formed as zoom optics with a displaceable lens group 6a, which can focus the measurement beam 10 at the center of curvature M1* of the lens surfaces S1, seen through S2. The zoom objective has a dual function to fulfill: it must image the center of curvature M1* onto the detector 12 and simultaneously image the surface S1 into the exit pupil of the zoom optics. In the case of telecentric zoom optics, this lies at infinity. In practice, it has therefore been found necessary for the zoom optics per se also to be displaceable in the z direction, i.e. along the optical axis, in order to satisfy both imaging criteria for varying aspherical lenses.

The measurement beam 10 reflected back at the glass rear face of the surface S1 is guided through the zoom optics again as a collimated beam onto the beam splitter 11, and imaged through the beam splitter surface onto the sensor 12, which is shown as a two-dimensional sensor in FIG. 2.

Figure 3:
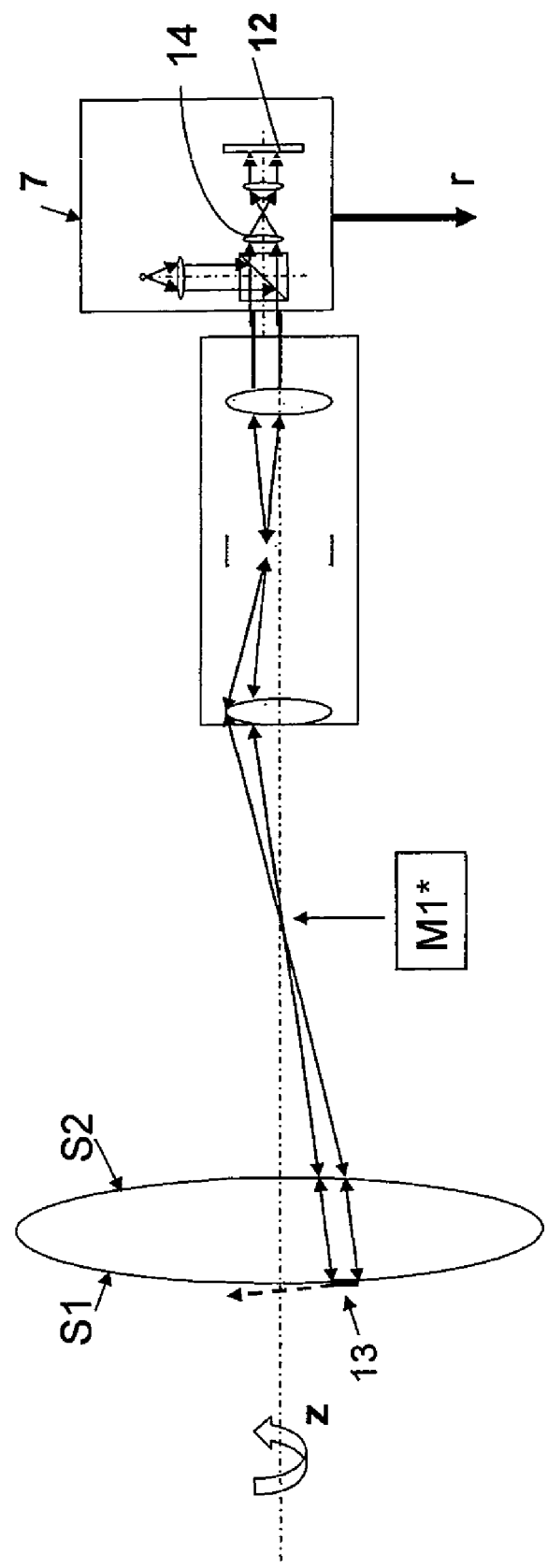
FIG. 3 shows the scanning of the test surface S1 by the radially guided movement of the measurement head that contains the interferometer or the wavefront sensor (reference example)

FIG. 3 shows the radial pupil scan, in which the measurement unit 7 is displaceable as a unit perpendicularly to the rotation axis 3 in the radial direction r. The measurement beam 10 now has a small diameter, so that it illuminates only a small surface segment 13 on the test surface S1. Due to the radial displacement of the measurement beam, it emerges from the focusing optics 6 at a varying angle so that different surface segments 13 on S1 are illuminated. The displacement of the device 7 is controlled such that the measurement beam 10 is guided over the entire diameter of the surfaces S1. In this case, the focal point M1* is used as an optical lever point since all scanned beams pass through it. In FIG. 3, the previous two-dimensional sensor 12 is now replaced by an absolutely measuring or multiwavelength interferometer or a wavefront sensor (reference example). To this end, small relay optics 14 may sometimes have to be installed in order to correctly image the pupil surface 13 onto the interferometer or the WFS (reference example). The result of the interferometer measurement is a very accurately determined distance value from the sensor to the respective surface segment 13, or a very accurate determination of the local surface inclination of 13 in the case of using a WFS (reference example) as the detector unit 12.

When the lens 2 is rotated about the rotation axis 3, the illuminated surface segment 13 migrates spirally over the surface S1. Depending on the rotation speed, radial speed and laser shot frequency, a denser or less dense network of measurement points on the surface S1 can be sampled.

Measurement Process:

For the desired accuracy of the surface profile determination in the subnanometer range, all the effects on the measurement process which result from the unavoidable instabilities of the various mechanical movements need to be eliminated or compensated for. The greatest influence comes from the polishing tool, which exerts pressure perpendicularly onto the surface S1 but also, depending on the viscosity of the polishing agent, leads to so-called "stick and slip" effects, i.e. stochastic movements in the azimuthal direction caused by friction. All these erratic influences lead to an uncontrolled position variation of the lens 2, which may be greater than the desired highly accurate determination of the surface profile.

Figure 4:
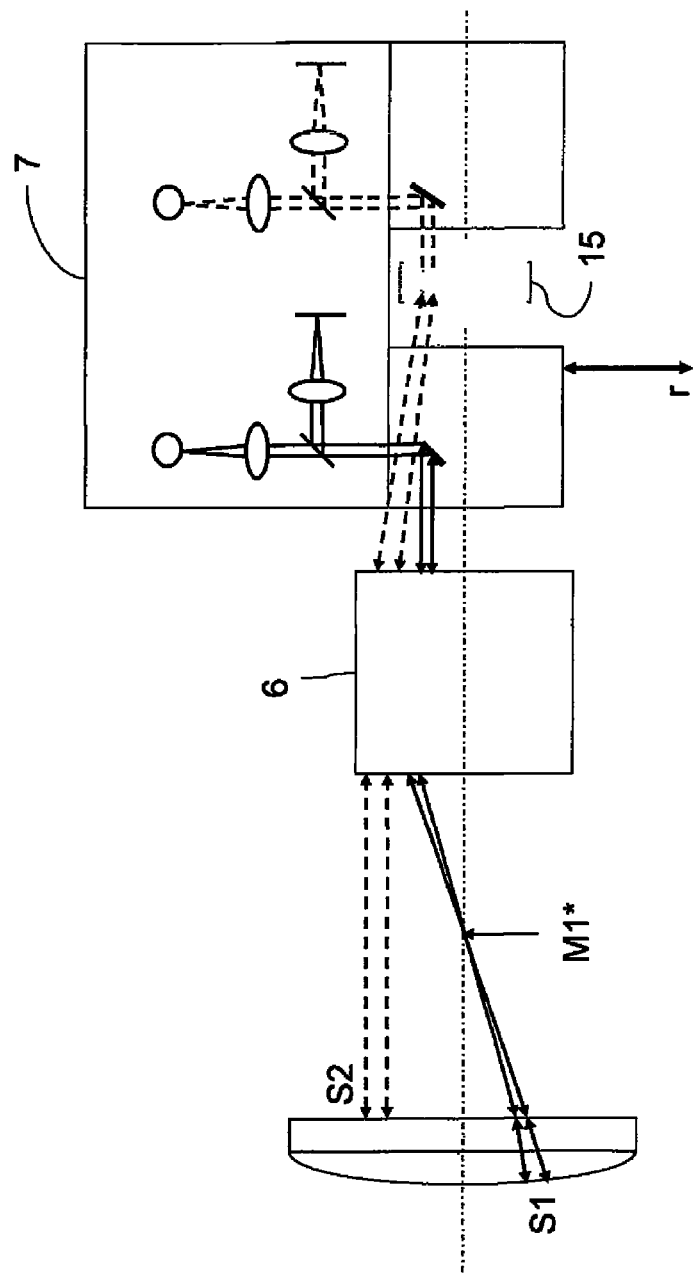
FIG. 4 shows the simultaneous scanning of the two surfaces S1 and S2 with two measurement units installed in the same measurement head.

A suitable alternative solution is described in FIG. 4:

In order to determine the aspherical surface profile of the surface S1 relative to the surface S2, the measurement beam 10 is first, as previously described, focused at the center of curvature M1* of the surface S1, seen through S2. Simultaneously, a second laser beam, preferably with a different wavelength, is introduced into the zoom optics 6, prefocused by means of an auxiliary lens 15 such that it is focused at the center of curvature of S2. FIG. 4 shows the special case in which S2 is a plane surface. Then, the second beam must strike S2 as a parallel beam. Both measurement heads are placed in the same measurement unit 7 and are therefore scanned simultaneously in the radial direction, and thus are subject to the same direction variations of the scan movement. If it is assumed that the topography of the surface S2 is already known from interferometric measurements in an external preliminary process, then the tilt errors of the lens holder, the mechanical influence of the polishing tool, that of the wobble error of the hollow axis 1, and the influences of the scanner movement can be determined from the measured distance values or surface inclination values of the measurement on surface S2. This knowledge allows the simultaneous measurements on S1 to be corrected correspondingly. Both measurements are thus mechanically correlated with one another as desired, and hence reflect the dynamic system instabilities. Yet since they come from two different light sources, there is no interference of the two beams which perturbs the interferometric distance measurement.

Thus, the measurement is independent of mechanical errors of the arrangement and machine tolerances.

Figure 5:
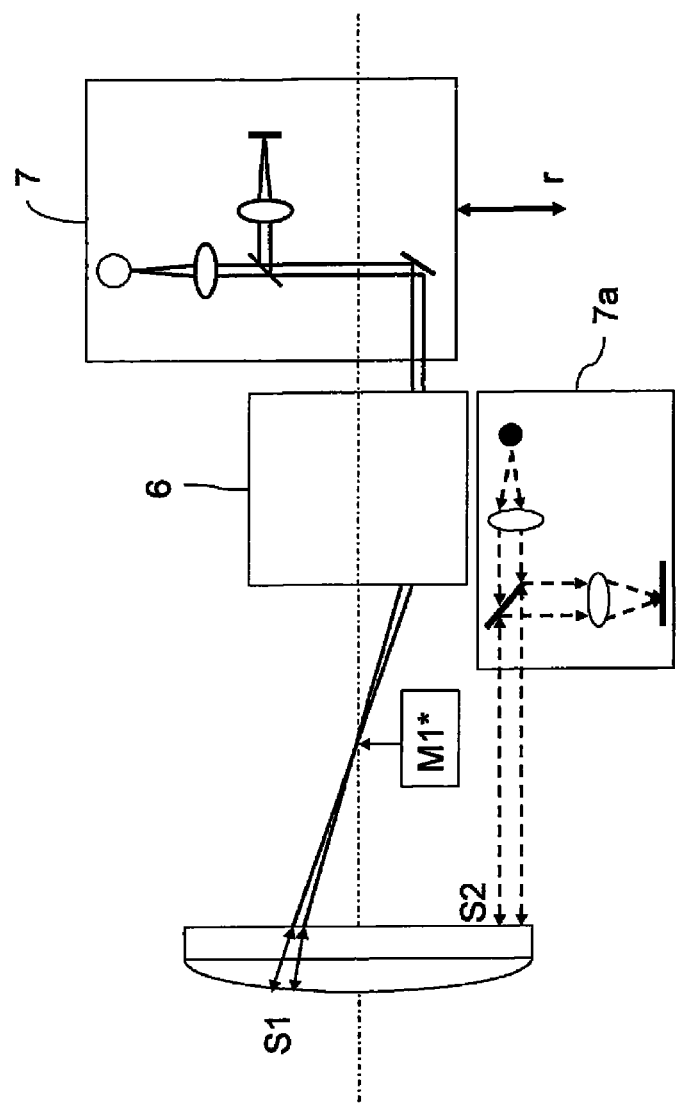
FIG. 5 shows a variant with restricted accuracy, in which the measurement of the surface S2 is only used to detect possible axial wobble errors.

Lastly, FIG. 5 shows a simpler variant in which the simultaneous measurement of the surface S2 used as a reference surface is not jointly scanned, and is also not guided through the zoom optics; rather, an annular zone of S2 is constantly illuminated by a statically fitted unit 7a, i.e. only the axial wobble error is monitored. This variant is technically simpler and therefore more economical, but it does not detect the irregularities of the scanner movement. It can therefore only be used in practice with reduced accuracy requirements of the polishing process, and in case of negligible position errors of the scanner mechanics.

LIST OF REFERENCES 1 hollow shaft
2 lens
3 rotation axis
4 holding chuck
5 grinding/polishing head
6, 6a focusing optics
7 measurement unit 7a static unit
8 laser
9 collimation lens
10 measurement beam
11 beam splitter
12 interferometer/wavefront sensor
13 surface segment/measurement point
14 relay optics for interferometer and wavefront sensor
15 auxiliary lens
S1, S2 surfaces of the lens 2
M1* position of the center of curvature of S1, seen through S2

The invention claimed is:

1. A method for zero-contact measurement of the topography of a spherically or aspherically curved air-glass surface of an optical lens or of an optical lens system, comprising the following steps:
   a) providing a rotatably mounted hollow shaft rotatable about its axis and operatively associated with an optical measurement unit having at least one measurement head including means for generating at least a first optical measurement beam,
   b) fastening the optical lens or lens system having the spherically or aspherically curved air-glass surface to be measured on an end side of the rotatably mounted hollow shaft such that the optical axis of the lens or lens system is at least approximately aligned with the rotation axis of the hollow shaft;
   c) arranging focusing optics for the optical measurement beam inside the hollow shaft;
   d) sampling a plurality of measurement points on the spherically or aspherically curved air-glass surface to be measured with the optical measurement beam through another air-glass surface having known optical characteristics, the another air-glass surface also being fastened to the hollow shaft and lying in the measurement direction before the curved air-glass surface to be measured; and
   e) using an absolutely measuring multiwavelength interferometer to determine for each approached measurement point on the surface to be measured, a distance from a fixed front surface of the optical measurement head, the distance determination being carried out sequentially for approached measurement points on the entire surface to be measured.

2. The method as claimed in claim 1,
characterized in that
the another air-glass surface lying in front of the sampled curved air-glass surface is simultaneously sampled with a second optical measurement beam distinguishable from the first optical measurement beam.

3. The method as claimed in claim 2,
characterized in that
the optical measurement beams sampling the two air-glass surfaces can be adjusted in their diameter and displaced over the measured surfaces in the radial direction during the simultaneous sampling.

4. The method as claimed in claim 2,
characterized in that
the measurement beams are respectively focused at the center of curvature of the sampled surface to be measured, as seen through the another air-glass surface lying before it, and at the center of curvature of the another surface which is to be measured as a reference.

5. The method as claimed in claim 2,
characterized in that
the measurement beams with which the sampling is carried out are laser beams.

6. The method as claimed in claim 5,
characterized in that
a subsegment of the sampled surface is imaged onto a wavefront sensor by one of the laser beams.

7. The method as claimed in claim 6,
characterized in that
a measurement of the distance to a reference measurement surface is simultaneously carried out by the other laser beam.

8. The method as claimed in claim 1,
characterized in that
the optical lens or lens system is rotated about a rotation axis at least approximately coinciding with the optical axis thereof; and
in that the measurement unit is displaceable perpendicularly to the rotation axis of the hollow shaft.

9. A method for zero-contact measurement of the topography of a spherically or aspherically curved air-glass surface of an optical lens or of an optical lens system as recited in claim 2,
characterized in that
the another air-glass surface is the reference measurement surface.

10. A device for zero-contact measurement of the topography of a spherically or aspherically curved air-glass surface of an optical lens or of an optical lens system, comprising:
   a) a rotatably mounted hollow shaft, on the end side of which the optical lens or the lens system having the spherically or aspherically curved air-glass surface to be measured is fastened such that the optical axis of the lens or lens system is at least approximately aligned with the rotational axis of the hollow shaft;
   b) an optical measurement unit associated with the hollow shaft and having at least one measurement head including means for generating at least one optical measurement beam,
   c) focusing optics for the at least one optical measurement beam arranged inside the hollow shaft, the focusing optics being formed such that a plurality of measurement points on the lens surface to be measured can be sampled with the optical measurement beam through another air-glass surface also fastened to the hollow shaft, having known optical characteristics and lying in the measurement direction before the lens surface to be measured;
   d) means for determining a distance from a fixed front surface of the optical measurement head for each approached measurement point on the lens surface to be measured by means of the measurement beam, the means for determining a distance being an absolutely measuring multiwavelength interferometer; and
   e) means for sequentially carrying out the distance determination for approached measurement points of the entire surface to be measured.

11. The device as claimed in claim 10,
characterized in that
the means for determining includes a laser for generating the measurement beam.

12. The device as claimed in claim 10,
characterized in that
the focusing optics are formed as zoom optics.

13. The device as claimed in claim 10,
characterized in that
the optical measurement unit includes a wavefront sensor.

14. The device as claimed in claim 10,
characterized in that
a round-trip delay time sensor is provided as a sensor for the distance measurement.

15. A device for zero-contact measurement of the topography of a spherically or aspherically curved air-glass surface of an optical lens or of an optical lens system as recited in claim 10,
characterized in that
the absolutely measuring multiwavelength interferometer also determines a distance from a fixed front surface of the optical measurement head for each approached measurement point on the another air-glass surface.

* * * * *